(12) United States Patent
Zou et al.

(10) Patent No.: US 8,314,997 B2
(45) Date of Patent: Nov. 20, 2012

(54) COMPACT ZOOM LENS BARREL

(75) Inventors: Long-Liang Zou, Guangdong (CN); Jian-Jun Zhang, Guangdong (CN); Chih-Jung Wu, Tu-Cheng (TW); Sheng-An Wang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/095,742

(22) Filed: Apr. 27, 2011

(65) Prior Publication Data

US 2012/0162782 A1 Jun. 28, 2012

(30) Foreign Application Priority Data

Dec. 25, 2010 (CN) .......................... 2010 1 0606846

(51) Int. Cl.
*G02B 15/14* (2006.01)
(52) U.S. Cl. ......... 359/699; 359/694; 359/696; 359/704

(58) Field of Classification Search .......... 359/694–704, 359/811–824
See application file for complete search history.

(56) References Cited

U.S. PATENT DOCUMENTS

| 7,684,137 | B2* | 3/2010 | Yamazaki | 359/826 |
| 7,835,085 | B2* | 11/2010 | Yamazaki | 359/695 |
| 2011/0149414 | A1* | 6/2011 | Li et al. | 359/696 |

* cited by examiner

*Primary Examiner* — Mohammed Hasan
(74) *Attorney, Agent, or Firm* — Altis Law Group, Inc.

(57) ABSTRACT

A zoom lens barrel includes a fixed barrel, a guide barrel received in the fixed barrel, a cam barrel received in the fixed barrel and housing the guide barrel, a zoom barrel sandwiched between the guide barrel and the cam barrel, and a lens cover covering on the zoom barrel. The cam barrel includes a flange radially formed on an end close to the lens cover. The zoom barrel includes a ring portion protruding out from an end close to the fixed barrel. A step surface is formed between the outer side surface of the zoom barrel and that of the ring portion. When the zoom lens barrel is in an unfolded state, the step surface interferingly resists against a bottom surface of the flange, to limit an axial movement between the cam barrel and the zoom barrel.

15 Claims, 7 Drawing Sheets

COMPACT ZOOM LENS BARREL

BACKGROUND

1. Technical Field

The present disclosure relates to image capture devices, particularly to a compact zoom lens barrel.

2. Description of Related Art

Generally, a zoom lens is composed of a group of lens barrels as an integral part of the image capture devices (hereinafter cameras). Often times, the lens barrels occupy a large portion of the camera in term of volume, size, and weight. Additionally, the lens barrels need some accessories, such as barrel rings, to assemble or connect the lens barrels to each other, thereby a complex and bulky structure of the camera is introduced.

Therefore, it is desirable to have a compact zoom lens barrel that can provide optimal portability to cameras.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
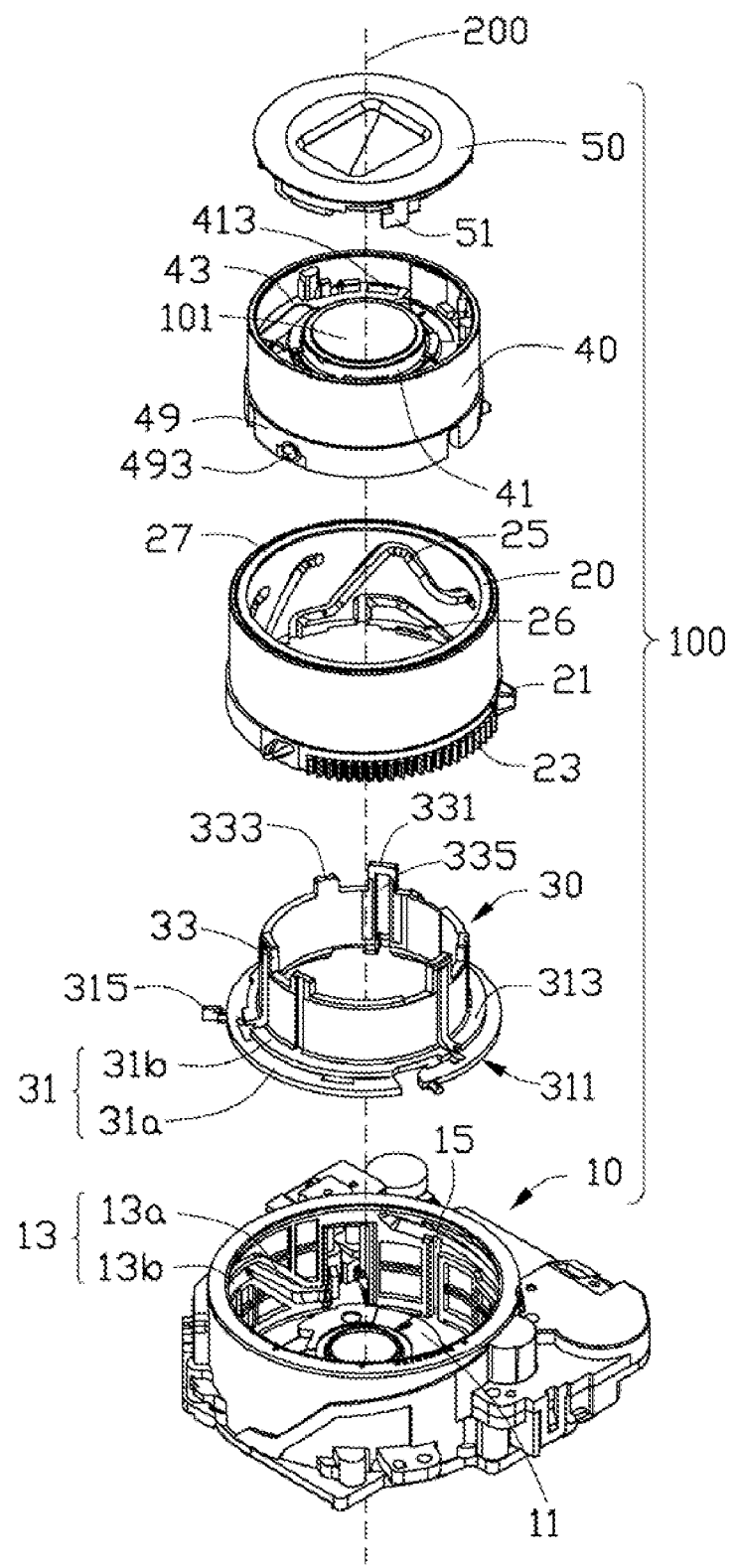
FIG. 1 is an isometric, exploded view of a zoom lens barrel, in accordance with an exemplary embodiment.
Figure 2:
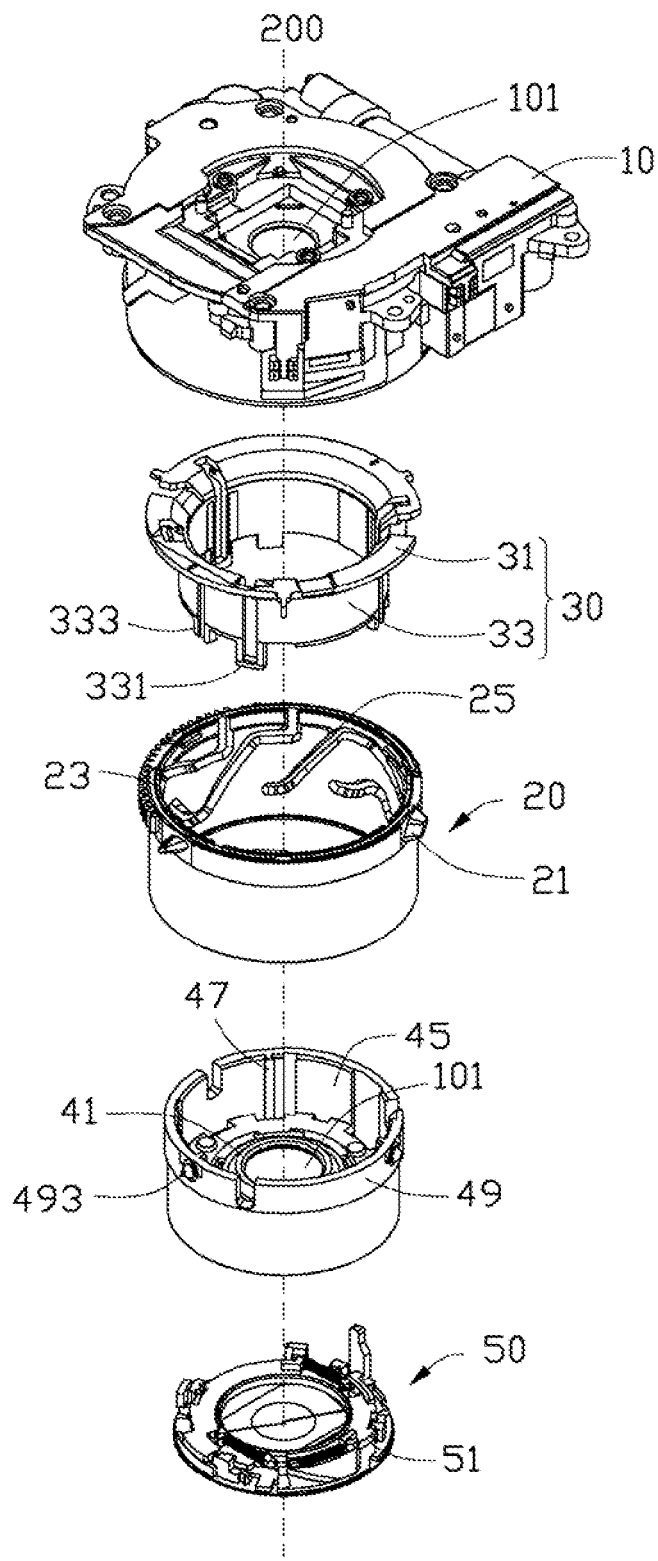
FIG. 2 is similar to FIG. 1, but viewed from another angle.
Figure 3:
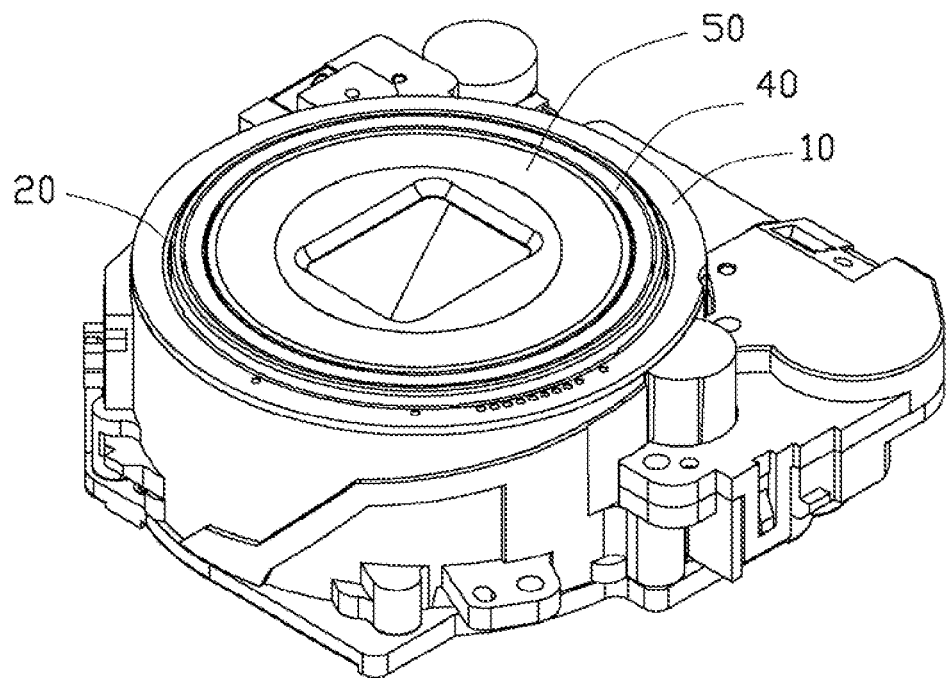
FIG. 3 is an isometric, assembled view of the zoom lens barrel of FIG. 1, wherein the zoom lens barrel is in a folded state.
Figure 4:
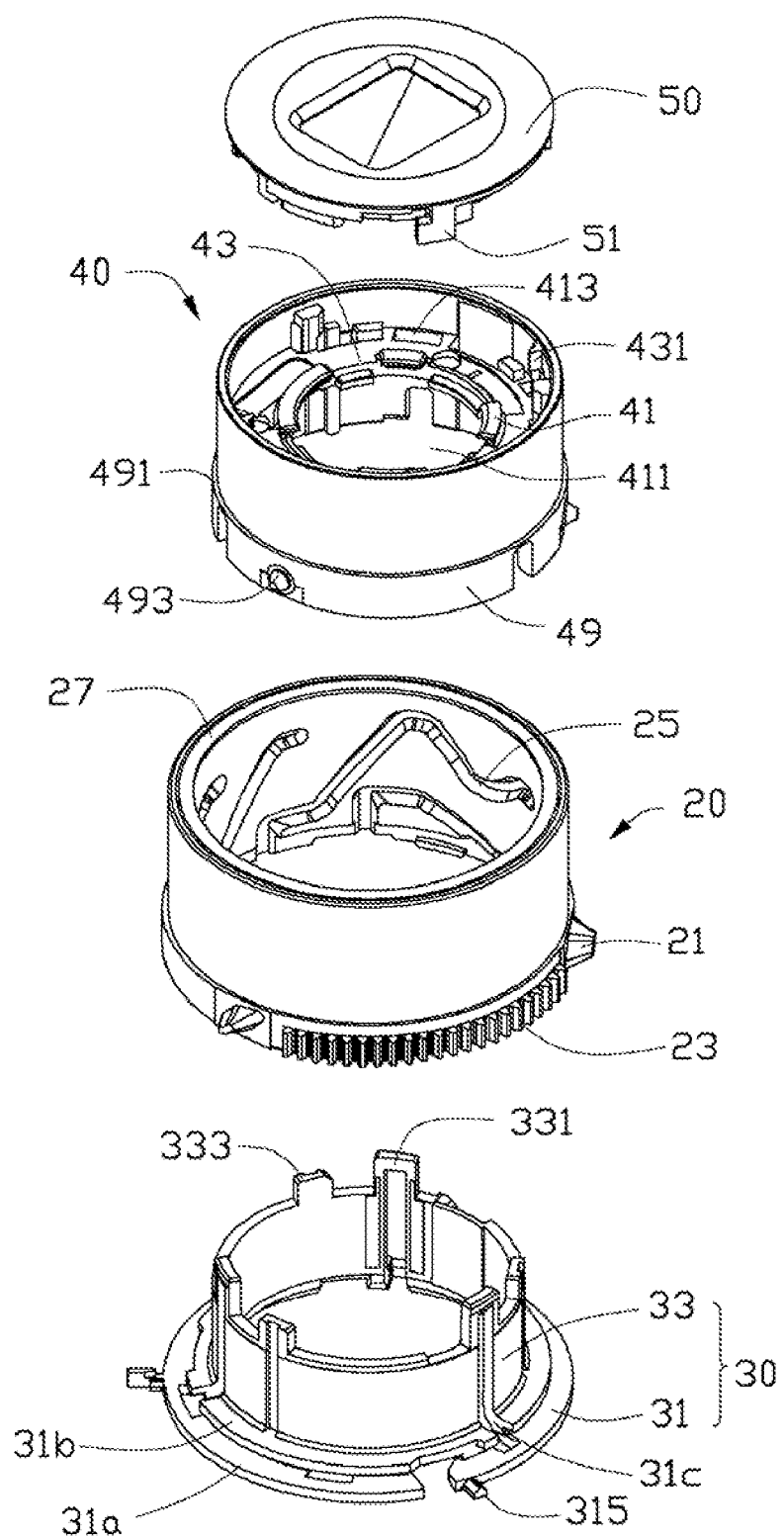
FIG. 4 is an exploded view of a guide barrel, a cam barrel, a zoom lens barrel and a lens cover of the zoom lens barrel of FIG. 1.
Figure 5:
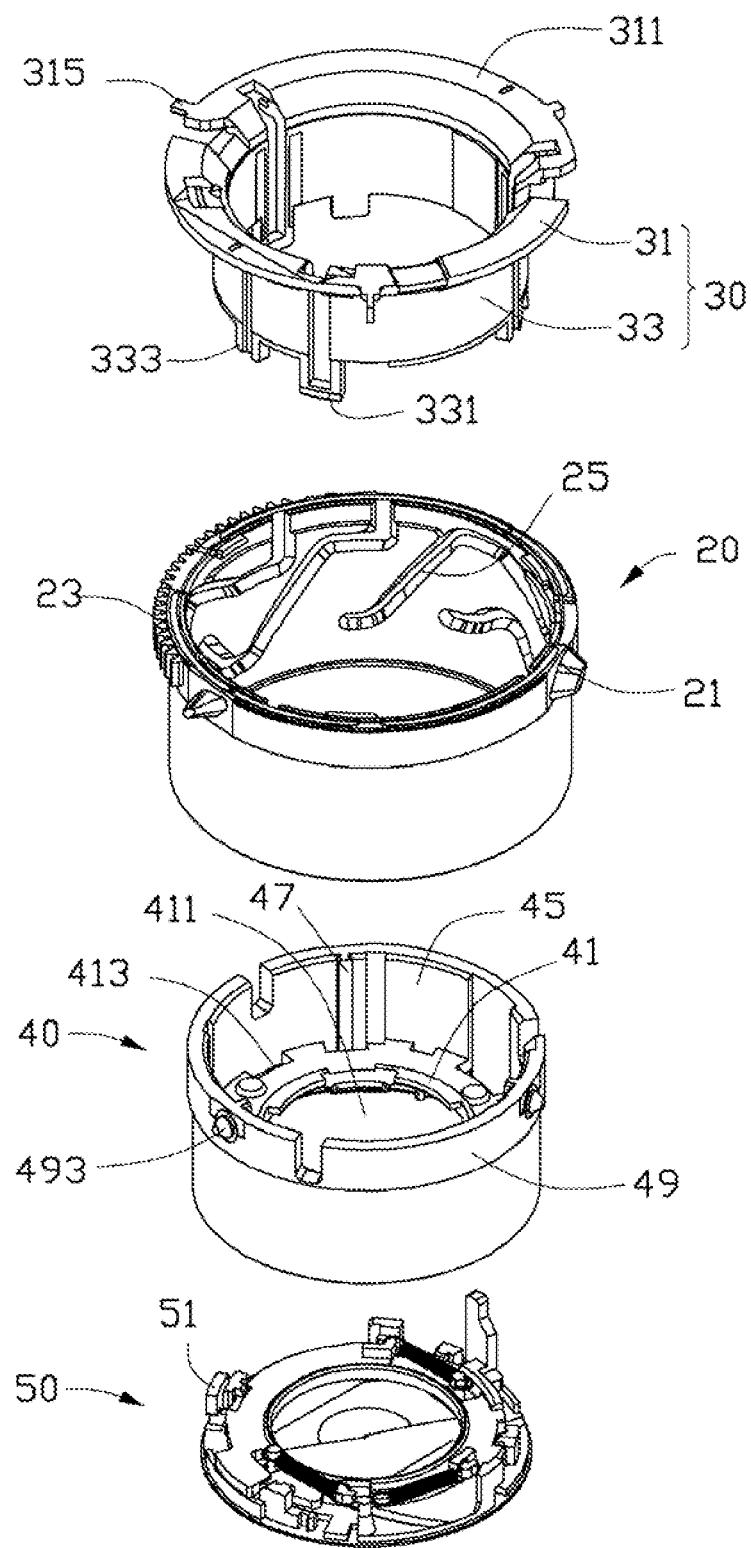
FIG. 5 is similar to FIG. 4, but viewed from another angle.

Referring to FIGS. 1 and 2, a zoom lens barrel 100 used for a compact zoom lens module (not shown), according to an exemplary embodiment, includes a fixed barrel 10, a guide barrel 30, a cam barrel 20, a zoom barrel 40, and a lens cover 50. The cam barrel 20 is housed by the fixed barrel 10. The zoom barrel 40 is housed by the cam barrel 20, while the guide barrel 30 is received in the zoom barrel 40. The zoom lens barrel 100 defines an optical axis 200 along the central axis of the fixed barrel 10. The cam barrel 20 can rotate relative to the fixed barrel 10 and be movable along the optical axis 200. Following the rotation of the cam barrel 20, the zoom barrel 40 can move along the optical axis 200. The guide barrel 30 is hold by the fixed barrel 10 and can maintain the zoom barrel 40 to move only along the optical axis 200. The lens cover 50 covers on an end of the zoom barrel 40 and can rotate about the optical axis 200 by manual operation.

The fixed barrel 10 defines a tubular receiving cavity 11 for receiving the cam barrel 20, the zoom barrel 40, and the guide barrel 30 in sequence. The fixed barrel 10 can be positioned in a lens holder (not shown). The inner side surface of the fixed barrel 10 defines a number of first cam grooves 13 and a number of sliding grooves 15 staggered with the first cam grooves 13. Each first cam groove 13 includes a first section 13a angled relative to the optical axis 200 and a second section 13b forming a circle on the inner side surface of the fixed barrel 10, and configured to direct a rotation track of the cam barrel 20. In this embodiment, the first section 13a can direct the cam barrel 20 to move along the optical axis 200 during rotation relative to the fixed barrel 10. The second section 13b ensures the cam barrel 20 does not rotate about the optical axis 200 more than a predetermined distance. The sliding grooves 15 are substantially parallel to the direction of the optical axis 200, and configured to provide a moving track for the guide barrel 30.

Referring to FIGS. 4 to 7, the cam barrel 20 is configured to direct the zoom barrel 40 to move along the optical axis 200 when being rotated. The cam barrel 20 is substantially tubular and defines three first cam pins 21, a set of gears 23, and a number of second cam grooves 25. The three first cam pins 21 equidistantly and radially protrude out from an end of the cam barrel 20 close to the fixed barrel 10, and are configured to correspondingly be received in the first cam grooves 13 of the fixed barrel 10. The gears 23 are arranged between two first cam pins 21. The second cam grooves 25 are equidistantly arranged on the inside wall of the cam barrel 20. Each second cam groove 25 is angled relative to the optical axis 200.

Furthermore, three arc-shaped blocks 26 for latching with the guide barrel 30 is radially extended from an end edge of the cam barrel 20 towards the axis 200, whereas a ring-shaped flange 27 is radially formed on an opposite end edge. In this embodiment, the radius of the flange 27 is about 0.1 mm to 1 mm.

The guide barrel 30 includes a base portion 31 and a barrel portion 33 extending up from the base portion 31 along the direction parallel to the optical axis 200. The guide barrel 30 is configured to guide the zoom barrel 40 to move along the optical axis 200.

The outer diameter of the base portion 31 is larger than that of the barrel portion 33. The base portion 31 includes an outer annulus 31a and an inner annulus 31b. The inner annulus 31b radially extends from an end of the barrel portion 33 and is arranged above the outer annulus 31a. The outer diameter of the inner annulus 31b is substantially equal to that of the zoom barrel 40. The inner annulus 31b is supported by three connecting portions 31c extending from the outer annulus 31a. The outer diameter of the outer annulus 31a is larger than that of the inner annulus 31b. Additionally, the outer diameter of the outer annulus 31a is substantially equal to that of the cam barrel 20 and to the inner diameter of the fixed barrel 10. The base portion 31 is received in the fixed barrel 10 and configured to hold the cam barrel 20 on the outer annulus 31a and hold the zoom barrel 40 on the inner annulus 31b. The outer annulus 31a includes a bottom surface 311 away from the lens cover 50, and the inner annulus 31b includes an upper surface 313 opposite to the bottom surface 311. When the zoom lens barrel 100 is in the folded (zoom out) state, the bottom surface 311 is in contact with the bottom of the fixed barrel 10. The upper surface 313 resists against an end surface of the zoom barrel 40. The blocks 26 of the cam barrel 20 is latched between the outer annulus 31a and the inner annulus 31b and movable around the optical axis 200, to limit the cam barrel 20 on the base portion 31.

Furthermore, the outer annulus 31a includes three equidistantly spaced sliding pins 315 protruding from the outside edge thereof, corresponding to the sliding grooves 15 of the fixed barrel 10. The sliding pins 315 latch in the sliding grooves 15 of the fixed barrel 10, to guide the movement of the guide barrel 30 in the direction of the sliding grooves 15.

The barrel portion 33 is received in the cam barrel 20. Three first levers 331 and three second levers 333 are alternately formed on an end of the barrel portion 33, each extending along the optical axis 200 away from the fixed barrel 10. Particularly, the three first levers 331 are arranged at regular angular intervals, as well as the three second levers 333. The length of the first lever 331 relative to the edge of the guide barrel 30 is longer than that of the second lever 333. In the present embodiment, each distal end of the first levers 331 and that of the second levers 333 is arc-shaped to reduce friction. Furthermore, the first levers 331 each define a rectangular through hole 335 therein, to reduce the weight of the first levers 331.

The zoom barrel 40 is sandwiched between the cam barrel 20 and the guide barrel 30, and configured to move along the optical axis 200 by the movement of the cam barrel 20. In this embodiment, the zoom barrel 40 is tubular. An annular interlayer 41 is defined inside the zoom barrel 40, extending from the inner side surface of the zoom barrel 40. The interlayer 41 defines a central through hole 411 for receiving at least one optical lens 101 and three latching holes 413 surrounding the central through hole 411 at regular intervals. The latching holes 413 correspond to the first levers 331, so that the first levers 331 can run through the latching holes 413 and be received in the zoom barrel 40, thereby a rotation of the guide barrel 30 can be prevented. In detail, the internal cavity of the zoom barrel 40 is divided into a front cavity 43 close to the lens cover 50 and a rear cavity 45 opposite to the front cavity 43 and close to the fixed barrel 10. Three resisting blocks 431 radially protrude from the inner side surface of the front cavity 43 in regular intervals. In the present embodiment, the protruding length of the resisting block 431 is equal to or smaller than the difference between the inner radius and the outer radius of the interlayer 41 along the radial direction of the zoom barrel 40. The inner surface of the zoom barrel 40 defines three axial slots 47 (see FIG. 2) extending from an end away from the lens cover 50 to the interlayer 41, to correspondingly receive the second levers 333. The three axial slots 47 can also limit the second levers 333 therein, and prevent the guide barrel 30 rotating about the zoom barrel 40.

The zoom barrel 40 further includes a ring portion 49 protruding out from an outer surface thereof, on an end towards the fixed barrel 10. A step surface 491 is formed between the outer side surface of the zoom barrel 40 and that of the ring portion 49. Three second cam pins 493 protrude outward from the outer surface of the ring portion 49. The second cam pins 493 are correspondingly received in the second cam grooves 25 of the cam barrel 20 and are movable along the track of the second cam grooves 25 under an external force acted on the cam barrel 20.

The lens cover 50 includes three L-shaped hooks 51, each extending toward the fixed barrel 10 along the optical axis 200 and then bent along the circular direction of the lens cover 50. The three L-shaped hooks 51 are arranged at regular intervals corresponding to the resisting blocks 431 of the zoom barrel 40. When the lens cover 50 covers the zoom barrel 40, the outer sidewall of the lens cover 50 contacts the inner side surface of the zoom barrel 40. When the lens cover 50 is rotated about the optical axis 200, the resisting blocks 431 of the zoom barrel 40 can be latched with or unlatched from the hooks 51.

In assembly, the guide barrel 30 is first housed in the fixed barrel 10 while the bottom surface 311 of the base portion 31 is in contact with the bottom of the fixed barrel 10. Then, the cam barrel 20 is housed in the fixed barrel 10 and supported by the outer annulus 31a of the guide barrel 30, with the first cam pins 21 of the cam barrel 20 received in the corresponding first cam grooves 13 and the sliding pins 315 of the guide barrel 30 received in the sliding grooves 15. The barrel portion 33 of the guide barrel 30 is surrounded by the sidewall of the cam barrel 20. The sidewall of the zoom barrel 40 is sandwiched between that of the cam barrel 20 and the barrel portion 33 of the guide barrel 30, and held by the inner annulus 31b of the guide barrel 30. The second cam pins 493 of the zoom barrel 40 are received in the corresponding second cam grooves 25. The at least one optical lens 101 can be positioned in the central through hole 411 of the interlayer 41, or positioned on the fixed barrel 10 or the guide barrel 30. The lens cover 50 covers on the zoom barrel 40, with the hooks 51 latching to the resisting blocks 431 in the zoom barrel 40.

Figure 6:
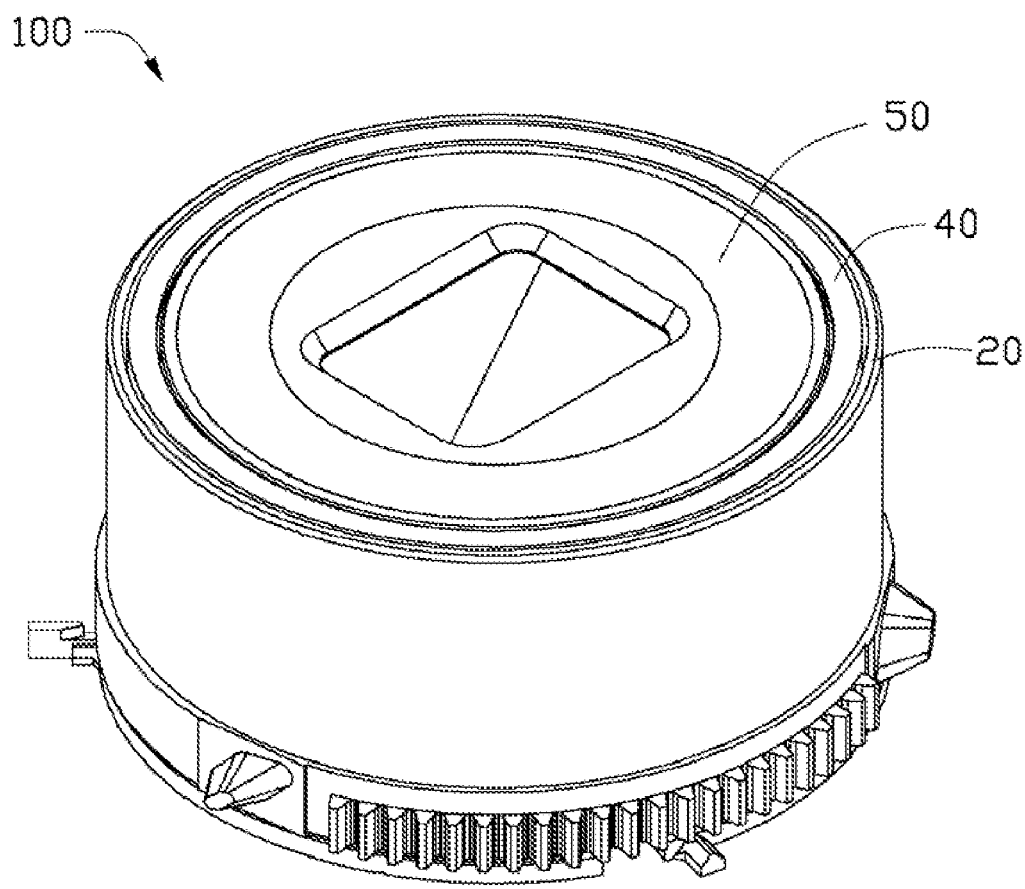
FIG. 6 is an assembled view of the guide barrel, the cam barrel, the zoom lens barrel and the lens cover of the zoom lens barrel of FIG. 4, in a folded state.
Figure 7:
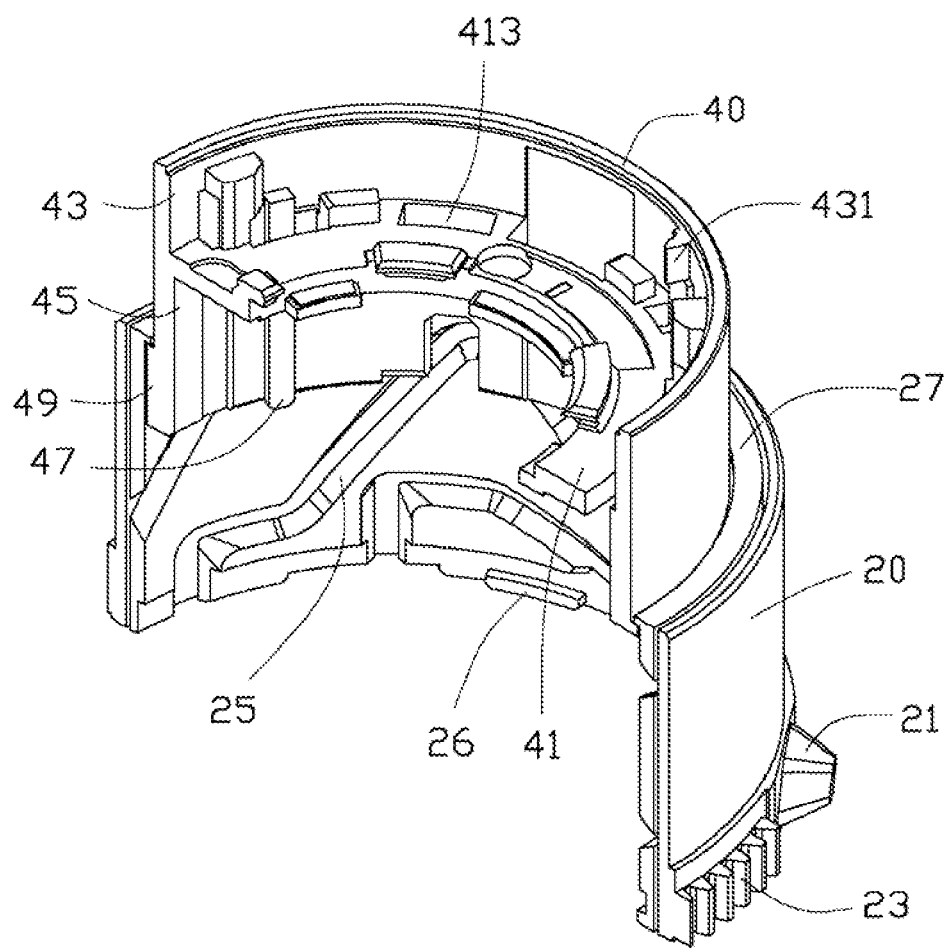
FIG. 7 is a partial view of the guide barrel, the cam barrel, the zoom lens barrel and the lens cover of the zoom lens of FIG. 4, in an unfolded state.

Referring to FIGS. 6 and 7, during zoom in/out operation, an external driving structure (not shown) drives the cam barrel 20 to rotate in the fixed barrel 10, moving the first cam pins 21 along the first section 13a of the first cam groove. As such, the cam barrel 20 and the guide barrel 30 move only along the optical axis 200 by virtue of the limitation of the sliding grooves 15. After the first cam pins 21 move into the second section 13bs of the first cam grooves 13, the cam barrel 20 is stopped and cannot move further along the optical axis 200 and rotates about the optical axis 200. When the cam barrel 20 rotates, the zoom barrel 40 is limited to merely move along the optical axis 200 relative to the fixed barrel 10, because the first levers 331 of the guide barrel 30 are received in the latching holes 413 and the second levers 333 are received in the axial slots 47 of the zoom barrel 40. When the zoom lens barrel 100 is in a zoom in state (unfolded state), the step surface 491 of the zoom barrel 40 interferingly resists against the flange 27 of the cam barrel 20, to limit the movement of the cam barrel 20 and prevent penetration of dust into the zoom lens barrel 100. The second cam pins 493 move along the second cam grooves 25, thereby driving the zoom barrel 40 to continuously move along the optical axis 200. As such, the optical lens 101 positioned in the zoom barrel 40 and that on the fixed barrel 10 can move relative to each other along the optical axis 200, to change the focal length of the zoom lens module. As a result, without the barrel rings, the camera employing the zoom lens barrel 100 still can efficiently and sufficiently implement zoom in or zoom out operations.

It will be understood that the disclosed embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A zoom lens barrel comprising:
   a fixed barrel;
   a guide barrel received in the fixed barrel;
   a cam barrel received in the fixed barrel and housing the guide barrel;
   a zoom barrel sandwiched between the guide barrel and the cam barrel; and
   a lens cover covering on the zoom barrel, wherein the cam barrel comprises a plurality of arc-shaped block radially extending form an end edge thereof and a flange radially positioned on an end close to the lens cover, the flange is opposite to the arc-shaped block, the guide barrel comprises a base portion and a barrel portion extending from the base portion along a direction parallel to an optical axis of the zoom lens barrel, the base portion comprises an outer annulus and an inner annulus spaced from the outer annulus, the inner annulus radially extends from an end of the barrel portion and is arranged above the outer annulus, the arc-shaped block is latched between the outer annulus and the inner annulus and movable around the optical axis, and the zoom barrel comprises a ring portion protruding out from an end close to the fixed barrel, a step surface is formed between an outer side surface of the zoom barrel and that of the ring portion, when the zoom lens barrel is in an unfolded state, the step surface interferingly resists against the flange, to limit a movement between the cam barrel and the zoom barrel along the optical axis.

2. The zoom lens barrel of claim 1, wherein the fixed barrel comprises an inner side surface and defines a plurality of first cam grooves and a plurality of sliding grooves staggered with the first cam grooves in the inner side surface, the cam barrel defines three first cam pins radially protruding out from an end of the cam barrel close to the fixed barrel, the first cam pins are correspondingly received in the first cam grooves, the guide barrel comprises three sliding pins protruding from an outside edge thereof and arranged at regular intervals, the sliding pins are respectively received in the sliding grooves to guide the movement of the guide barrel in the direction of the sliding grooves.

3. The zoom lens barrel of claim 2, wherein each first cam groove comprises a first section angled relative to the optical axis of the zoom lens barrel and a circular second section, the first section is capable of directing the cam barrel to rotate relative to the fixed barrel and to move along the optical axis, the second section is capable of maintaining the cam barrel to rotate about the optical axis.

4. The zoom lens barrel of claim 2, wherein the sliding grooves are substantially parallel to the direction of the optical axis.

5. The zoom lens barrel of claim 2, wherein the cam barrel defines a set of gears arranged between two first cam pins, and a plurality of second cam grooves arranged on an inside wall thereof, and comprises three second cam pins protruding out from an outer surface of the ring portion, the second cam pins are correspondingly received in the second cam grooves of the cam barrel and movable along the track of the second cam grooves.

6. The zoom lens barrel of claim 1, wherein an outer diameter of the inner annulus is substantially equal to that of the zoom barrel, an outer diameter of the outer annulus is larger than that of the inner annulus and substantially equal to an inner diameter of the fixed barrel, the outer diameter of the outer annulus is also substantially equal to that of the cam barrel.

7. The zoom lens barrel of claim 1, wherein the guide barrel comprises three connecting portions extending from the outer annulus, the inner annulus is supported by the three connecting portions.

8. The zoom lens barrel of claim 1, wherein the outer annulus comprises a bottom surface far away from the lens cover, and the inner annulus comprises an upper surface opposite to the bottom surface, when the zoom lens barrel is in the folded state, the bottom surface contacts with the bottom of the fixed barrel, the upper surface resists against an end surface of the zoom barrel.

9. The zoom lens barrel of claim 1, wherein the barrel portion comprises three first levers arranged on an end of the barrel portion, each of the first levers extends along the optical axis away from the fixed barrel; the zoom barrel comprises an annular interlayer, the interlayer extends from an inner surface of the zoom barrel, the interlayer defines a central through hole for receiving at least one optical lens and three latching holes surrounding the central through hole with regular angular intervals, the latching holes correspond to the first levers so that the first levers pass through the latching holes and are received in the zoom barrel.

10. The zoom lens barrel of claim 9, wherein the barrel portion comprises three second levers, each of the second levers extends along the optical axis away from the fixed barrel, the first levers and the second levers are alternately arranged on the end of the barrel portion, the length of each first lever relative to the edge of the guide barrel is longer than that of each second lever; the inner surface of the zoom barrel defines three axial slots respectively extending from an end away from the lens cover to the interlayer, the three axial slots receive the second levers correspondingly.

11. The zoom lens barrel of claim 10, wherein each distal end of the first levers and each distal end of the second levers are arc-shaped.

12. The zoom lens barrel of claim 10, wherein the first levers each defines a rectangular through hole therein.

13. The zoom lens barrel of claim 9, wherein the zoom barrel defines a front cavity close to the lens cover and a rear cavity close to the fixed barrel, the interlayer is positioned between the front cavity and the rear cavity, the zoom barrel comprises three resisting blocks radially protruding from an inner side surface of the front cavity and arranged in regular intervals, the lens cover comprises three L-shaped hooks each extending toward the fixed barrel along the optical axis and then bent along the circular direction of the lens cover, the hooks latch the resisting blocks respectively.

14. The zoom lens barrel of claim 1, wherein the flange is shaped as a ring.

15. The zoom lens barrel of claim 1, wherein the radius of the flange is from 0.1 mm to 1 mm.

* * * * *